United States Patent [19]

Fedrigo

[11] 4,237,467

[45] Dec. 2, 1980

[54] THERMAL WRITING DEVICE FOR RECORDING APPARATUS

[75] Inventor: Renzo Fedrigo, San Fruttuoso - Monza, Italy

[73] Assignee: C.G.S. Istrumenti Di Misura S.p.A., Monza, Italy

[21] Appl. No.: 938,795

[22] Filed: Sep. 1, 1978

[30] Foreign Application Priority Data

Sep. 19, 1977 [IT] Italy ............................ 27668 A/77

[51] Int. Cl.³ .......................................... G01D 15/10
[52] U.S. Cl. ............................ 346/76 R; 346/139 C
[58] Field of Search ............. 346/76 PH, 76 R, 139 C

[56] References Cited

U.S. PATENT DOCUMENTS

| | | | |
|---|---|---|---|
| 3,340,381 | 9/1967 | Best ............................. | 346/76 PH X |
| 3,354,817 | 11/1967 | Sakurai et al. .............. | 346/76 PH X |
| 3,394,385 | 7/1968 | Lloyd ........................... | 346/76 PH X |
| 3,453,647 | 7/1969 | Bernstein et al. ............ | 346/76 PH |
| 3,777,116 | 12/1973 | Brescia et al. ............... | 346/76 PH X |
| 3,811,030 | 5/1974 | Veach .......................... | 346/139 C UX |
| 3,862,394 | 1/1975 | Lane ............................. | 346/76 PH X |
| 4,016,572 | 4/1977 | Hubbard ...................... | 346/139 C |
| 4,027,311 | 5/1977 | Ambrosio .................... | 346/139 C X |

FOREIGN PATENT DOCUMENTS

| | | | |
|---|---|---|---|
| 709521 | 5/1965 | Canada ................................. | 346/76 PH |
| 1273213 | 7/1968 | Fed. Rep. of Germany ....... | 346/139 C |

*Primary Examiner*—George H. Miller, Jr.
*Attorney, Agent, or Firm*—George E. Kersey

[57] ABSTRACT

A thermal writing device for recording apparatus using heat-sensitive paper, in which the nib of the device is formed by a resistor having an electric resistance that is substantially dependent on temperature. An electric supply and control circuit directly supplies the resistor and controls its temperature so as to heat the stylus.

15 Claims, 2 Drawing Figures

THERMAL WRITING DEVICE FOR RECORDING APPARATUS

BACKGROUND OF THE INVENTION

1. Field of the Invention

The invention relates to thermal writing devices for recording apparatus using heat-sensitive paper, comprising:

a nib including a writing means and a resistor having an electric resistance substantially dependent on temperature, and an electric supply and control circuit which supplies the resistor and controls its temperature so as to heat the writing means.

2. Prior art

In devices of the aforementioned kind, the heat-sensitive paper is moved under the writing means, which is heated by the resistor. The heat of the writing means brings about a chemical reaction which leaves a visible track on the card.

The intensity and width of the track depend on the shape of the writing means, the pressure which it exerts on the paper, the speed with which it moves along the paper, and the temperature of the actual writing means.

However, in thermal writing devices of the aforementioned kind, the problem arises of regulating the temperature of the writing means.

According to a known method, the writing means comprises a stylus made of heat-conducting material in an electrically insulating holder or sleeve, round which the heating resistor is coiled. The resistor is supplied by the supply and control circuit, which regulates the supply current in dependence on the resistance of the resistor, so as to keep the temperature substantially equal to a predeterminated reference value.

However, the aforementioned thermal writing devices have some disadvantages, the main disadvantage being that, owing to the high resistance and thermal capacity introduced by the sleeve between the resistor and the writing means, the temperature of the writing means does not remain at the reference value but undergoes substantial oscillations around it. Such temperature variations may have an unacceptable effect on the uniformity and regularity of the visible track.

The aforementioned disadvantage is particularly serious when the heat-sensitive paper used is in two or more colours, when the colour of the track depends closely on the temperature of the writing means.

A second disadvantage is that, because of the thermal characteristics of the sleeve, the writing means is not excessively urged towards thermal equilibrium. As a result, recording apparatus using the aforementioned thermal writing devices is unsuited for recording rapidly-varying phenomena.

An object of the invention, therefore, is to construct a thermal writing device of the aforementioned kind which obviates the aforementioned disadvantages and is also rugged and wear resistant, economic to manufacture and may be used with advantage, even in multi-track recording apparatus.

SUMMARY OF THE INVENTION

To this end, the invention relates to a thermal writing device of the aforementioned kind, the main feature of which is that the resistor is shaped so that it itself serves as the writing means.

According to another feature of the invention, the supply and control cicuit comprises:

a measuring bridge, one arm of which supplies the resistor;

a power amplifier for supplying the measuring bridge;

a source of a.c. electric signals;

a gate circuit disposed between the source and the input of the power amplifier, and an error amplifier adapted to amplify the voltage present at the sampling diagonal of the measuring bridge and generate a control signal for the gate ciruit, the control signal enabling the gate circuit to supply the electric signal generated by the source of the power amplifier for periods of time, the duration and sequence of which depend on the amount of unbalance of the measuring bridge, the dependence being such that the length and nearness to one another of the supply periods vary in proportion to the extent to which the temperature of the resistor is lower than a given reference value, and the shortness and distance between the periods vary with the temperature of the resistor with respect to the reference value.

The invention will now be described with reference to the accompanying drawings, which are given by way of nonlimitative example only.

DETAILED DESCRIPTION OF THE INVENTION

Figure 1:
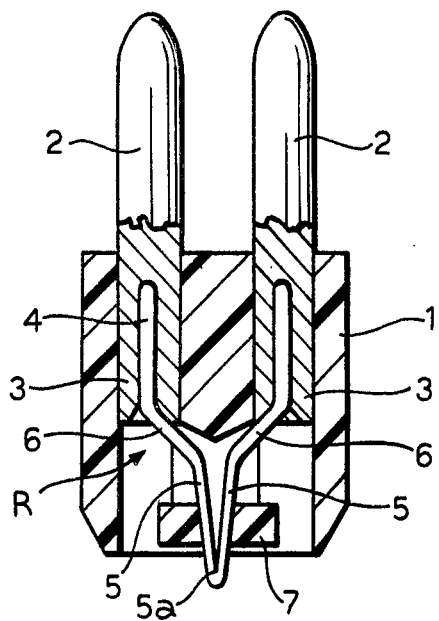
FIG. 1 is a view in section of a nib of a thermal device according to the invention.

Reference 1 denotes a substantially cylindrical plastics cover or holder having a flat cross-section. Holder 1 contains a pair of male pins 2 projecting from one end thereof.

The inner ends 3 of pins 2 are connected to two parallel end arms 4 of a resistor R. Resistor R comprises a metal wire bent to form a narrow loop 5 connected to the two end arms 4 by two inclined portions 6. The tip 5a of the loop 5 projects from the opposite end of holder 1 from pins 2 and constitutes the writing means.

Near the writing tip 5a, loop 5 is borne by holder 1 via a ceramic ring 7.

Resistor R is made of a material—pure iron or nickel—having a resistivity which varies substantially with temperature.

Resistor R is coated with a film of wear-resistant ceramic material to protect the tip 5a from rubbing against the heat-sensitive paper.

The two pins 2 can be used to insert resistor R into a supply and control circuit.

Figure 2:
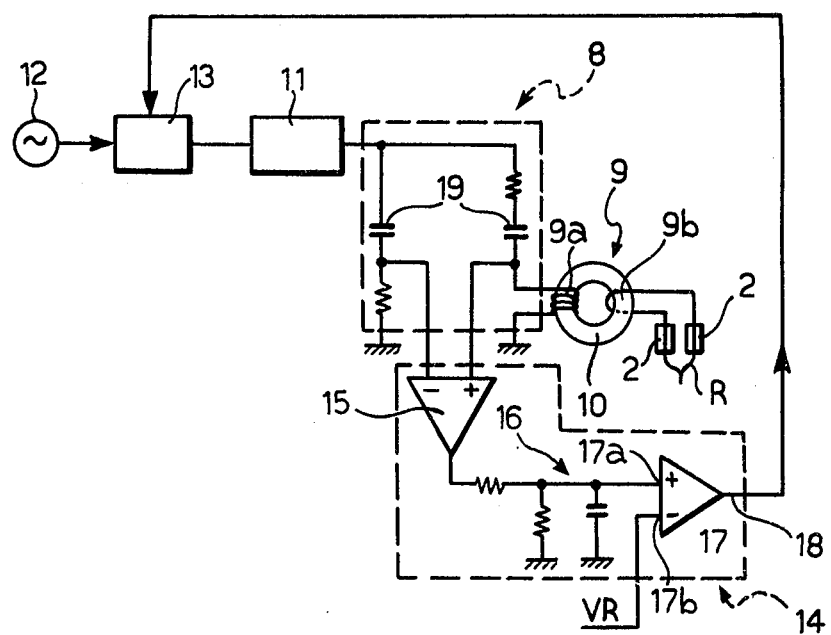
FIG. 2 is an electric diagram, partly in block form, of a supply and control circuit of a thermal writing device according to the invention.

In FIG. 2, an Owen bridge 8 is connected to resistor R via an impedance-matching transformer 9 and pins 2. Transformer 9 has a ferrite core 10 magnetically coupling a primary winding 9a, inserted in bridge 8, to a secondary winding 9b connected to pins 2.

Transformer 9 is needed since the electrical resistance of resistor R is very low, so that energy will be wasted if the resistor is supplied at the normal voltages of 5–12 V used in the circuit.

Bridge 8 is supplied by a power amplifier 11 whose input is connected to a source 12 of high-frequency a.c. signals.

A gate circuit 13 is disposed between source 12 and the input of power amplifier 11.

An error amplifier 14 samples the voltage at the sampling diagonal of bridge 8 and, after amplifying it via a differential amplifier 15, supplies it to an integrating circuit 16. The output of circuit 16 is connected to one of two inputs 17a of a comparing circuit 17, the second input 17b of which is supplied with a reference voltage $V_R$.

The output 18 of circuit 17 generates a signal controlling the gate circuit 13. The control signal enables the signal generated by source 12 to pass through gate circuit 13 to power amplifier 11 during a succession of supply periods having a duration and spacing in time which depend on the amount of unbalance of the Owen bridge 8, i.e. on the temperature of resistor R. More specifically, the supply periods are longer and nearer one another in proportion to the extent that the temperature of resistor R is lower than a predeterminated reference value, and are shorter and spaced apart in proportion to the temperature of resistor R with respect to the aforementioned reference value.

Thus, the supply to resistor R from amplifier 11 is regulated by the negative feedback method, with the result that the temperature of resistor R is kept substantially equal to the aforementioned reference value. A variation in the reference voltage $V_R$ at input 17b of comparator circuit 17 results in a variation in the reference value of the temperature of resistor R. Thus, in the case when multi-coloured heat-sensitive paper is used, the colour of the visible track can be selected by varying the reference voltage $V_R$.

The Owen bridge 8 is used as a measuring bridge since the two capacitors 19 in the top branch of the bridge prevent the flow of d.c. and thus protect the downstream electronic components in the event of a fault in amplifier 11.

Of course, without departing from the principle of the invention, the embodiments can be widely varied from what has been described and illustrated, without thereby departing from the scope of the invention.

What is claimed is:

1. A thermal writing device for recording apparatus using heat-sensitive paper and comprising:
    a nib including writing means in the form of a resistor having an electric resistance substantially dependent on temperature and shaped as a stylus, and
    an electric supply control circuit which supplies the resistor directly and controls its temperature so as to heat the writing means, comprising
    a measuring bridge, one arm of which supplies the resistor;
    a power amplifier for supplying the measuring bridge;
    a source of a.c. electric signals;
    a gate circuit disposed between the source and the input of the power amplifier, and
    an error amplifier adapted to amplify the voltage present at the sampling diagonal of the measuring bridge and generate a control signal for the gate circuit, the contrl signal enabling the gate circuit to supply the electric signal generated by the source of the power amplifier for periods of time, the duration and sequence of which depend on the amount of unbalance of the measuring bridge, the dependence being such that the length and nearness to one another of the supply periods vary in proportion to the extent to which the temperature of the resistor is lower than a given reference value, and the shortness and distance between the periods value, and the shortness and distance between the periods vary with the temperature of the resistor with respect to the reference value.

2. A device according to claim 1, characterised in that the nib comprises a cover or holder made of electrically insulating material and containing the resistor which is made of a metal wire bent to form a narrow loop; the tip of the loop projects from the holder and constitutes the writing means.

3. A device according to claims 1, characterised in that the metal wire constituting resistor is of iron.

4. A device according to claim 1, characterised in that the metal wire constituting resistor is of nickel.

5. A device according to claims 1, characterised in that the resistor comprises two parallel end arms for connecting to the electric supply and control circuit and two inclined convergent portions which connect the arms to the narrow loop constituting the writing means.

6. A device according to claims 1, characterised in that two parallel arms of resistor are connected to two connectors disposed in the holder and used for connecting to the supply and control circuit.

7. A device according to claims 1, characterised in that a holder is substantially cylindrical and has a flat cross-section.

8. A device according to claim 1, characterised in that the measuring bridge supplies the resistor via an impedance-matching transformer having a ferrite core comprising a primary winding which is inserted in a branch of the measuring bridge and a secondary winding which is connected to the resistor.

9. A device according to claim 1, characterised in that the measuring bridge is an Owen bridge.

10. A device according to claim 1, characterised in that the signal supply generates a high-frequency signal.

11. A device according to claim 1, characterised in that the error amplifier comprises a differential amplifier whose input is connected to the sampling diagonal of the measuring bridge and whose output supplies an integrating circuit; the output of the integrating circuit is connected to one of the two inputs of a comparing circuit, the second input of which is supplied with a reference voltage; the value of the reference voltage determines the aforementioned reference value of the temperature of resistor.

12. A device according to claims 1, characterised in that the metal wire constituting resistor is coated with a film of wear-resistant material.

13. A device according to claim 12, characterised in that the coating is ceramic.

14. A device according to claims 1, characterised in that a narrow loop of resistor is borne near its writing tip by the holder via a supporting ring.

15. A device according to claim 14, characterised in that the ring is made of ceramic material.

* * * * *